United States Patent
Tabb et al.

(10) Patent No.: US 8,216,461 B2
(45) Date of Patent: *Jul. 10, 2012

(54) METHOD OF ADDING FUEL ADDITIVE TO DIESEL FUEL

(75) Inventors: Scott J. Tabb, Huntersville, NC (US); Ronald P. Rohrbach, Flemington, NJ (US); Gary B. Zulauf, Findlay, OH (US); Peter D. Unger, Convent Station, NJ (US); Weston H. Gerwin, Perrysburg, OH (US); Daniel E. Bause, Flanders, NJ (US); Gerard W. Bilski, Perrysburg, OH (US)

(73) Assignee: Farm Group IP LLC (NZ)

( * ) Notice: Subject to any disclaimer, the term of this patent is extended or adjusted under 35 U.S.C. 154(b) by 0 days.

This patent is subject to a terminal disclaimer.

(21) Appl. No.: 13/104,642

(22) Filed: May 10, 2011

(65) Prior Publication Data

US 2011/0277374 A1    Nov. 17, 2011

Related U.S. Application Data

(63) Continuation of application No. 11/864,962, filed on Sep. 29, 2007, now Pat. No. 7,938,960.

(60) Provisional application No. 60/827,569, filed on Sep. 29, 2006.

(51) Int. Cl.
*B01D 15/00* (2006.01)

(52) U.S. Cl. ............ 210/198.1; 210/205; 210/103; 210/104; 210/105

(58) Field of Classification Search ............ 210/198.1, 210/205, 103–105
See application file for complete search history.

(56) References Cited

U.S. PATENT DOCUMENTS

| | | | |
|---|---|---|---|
| 3,336,223 | A | 8/1967 | Kneeland |
| 3,963,512 | A | 6/1976 | Swift et al. |

(Continued)

FOREIGN PATENT DOCUMENTS

WO    03018988 A1    3/2003

(Continued)

OTHER PUBLICATIONS

Benesi, HA, "Acidity of Catalyst Surfaces, I. Acid Strength from Colors of Absorbed Indicators," The Journal of the American Chemical Society, vol. 78, 5490-5494 (1956).

(Continued)

*Primary Examiner* — Chester Barry
(74) *Attorney, Agent, or Firm* — Barnes & Thornburg LLP

(57) ABSTRACT

Disclosed herein is an apparatus and method for adding a lubricating additive to a diesel fuel. In one embodiment, a system for controlling the release of a fuel additive into a diesel fuel is provided, the system having: a housing having at least one inlet opening and at least one outlet opening configured to define a flow path therethrough; filter media disposed in the flow path, the filter media comprising an adsorbent that removes sulfur containing compounds from diesel fuel passing through the housing; an additive cartridge configured to disperse a lubricating additive into the diesel fuel; a controller for controlling the amount of lubricating additive that is released from the additive cartridge into the diesel fuel; and at least one sensor configured to monitor the lubricant additive content in the diesel fuel and provide a signal indicative of the lubricant additive content in the diesel fuel to the controller, wherein the controller releases the additive from the additive cartridge based upon the signal received from the at least one sensor.

15 Claims, 7 Drawing Sheets

U.S. PATENT DOCUMENTS

| | | | |
|---|---|---|---|
| 4,018,816 | A | 4/1977 | Onoda et al. |
| 4,075,098 | A | 2/1978 | Paul et al. |
| 4,145,297 | A | 3/1979 | Gatti et al. |
| 4,419,292 | A | 12/1983 | Yamanaka et al. |
| 4,662,327 | A | 5/1987 | Srugel et al. |
| 4,752,596 | A | 6/1988 | Bergna et al. |
| 5,456,217 | A | 10/1995 | Thunker et al. |
| 5,507,942 | A | 4/1996 | Davis |
| 5,591,330 | A | 1/1997 | Lefebvre |
| 5,853,436 | A | 12/1998 | Cherpeck |
| 5,997,593 | A | 12/1999 | McDonnell et al. |
| 6,080,212 | A | 6/2000 | Beimesch et al. |
| 6,187,939 | B1 | 2/2001 | Sasaki et al. |
| 6,238,554 | B1* | 5/2001 | Martin et al. .................. 210/109 |
| 6,361,573 | B1 | 3/2002 | Henly |
| 6,562,086 | B1 | 5/2003 | Gentry et al. |
| 6,609,534 | B1* | 8/2003 | Beaney et al. ............. 137/87.03 |
| 6,676,837 | B2* | 1/2004 | Keeton, Jr. .................... 210/620 |
| 6,749,754 | B1 | 6/2004 | Holder et al. |
| 6,835,218 | B1* | 12/2004 | Drozd et al. .................... 44/459 |
| 7,244,350 | B2 | 7/2007 | Martin et al. |
| 7,575,688 | B2 | 8/2009 | Rohrbach et al. |
| 7,938,960 | B2* | 5/2011 | Tabb et al. ................. 210/198.1 |
| 2002/0028505 | A1* | 3/2002 | Sakai et al. ................. 435/299.1 |
| 2003/0070990 | A1 | 4/2003 | Rohrbach et al. |
| 2004/0200758 | A1 | 10/2004 | Yang et al. |
| 2005/0205470 | A1 | 9/2005 | Ramirez-Corredores et al. |
| 2005/0217638 | A1* | 10/2005 | Kaneko ......................... 123/294 |
| 2005/0236334 | A1 | 10/2005 | Rohrbach et al. |
| 2005/0269254 | A1* | 12/2005 | Roitman ........................ 210/252 |
| 2006/0065584 | A1 | 3/2006 | Hacker et al. |
| 2007/0138062 | A1 | 6/2007 | Varma et al. |
| 2007/0189939 | A1 | 8/2007 | Rohrbach et al. |
| 2008/0257785 | A1 | 10/2008 | Varma et al. |
| 2008/0289496 | A1 | 11/2008 | Poshusta et al. |
| 2009/0000990 | A1 | 1/2009 | Toida |

FOREIGN PATENT DOCUMENTS

| | | | |
|---|---|---|---|
| WO | 2004099351 | A1 | 11/2004 |

OTHER PUBLICATIONS

European Search Report for European Application No. 07843576.5-2104/2066417; PCT/US2007/080024, mailed Oct. 22, 2010, 2 pages.

International Preliminary Report dated Apr. 9, 2009 for International Application No. PCT/US2007/080024, International Filing Date Sep. 29, 2007.

International Search Report dated Mar. 17, 2008, International Application No. PCT/US2007/080024.

Written Opinion of International Searching Authority Dated Mar. 17, 2008, International Application No. PCT/US2007/080024.

Pine, S. H., et al., Organic Chemistry, 4th ed., McGraw-Hili Book Co., New York (1980) at p. 198.

* cited by examiner

METHOD OF ADDING FUEL ADDITIVE TO DIESEL FUEL

CROSS REFERENCE TO RELATED APPLICATIONS

This application is a continuation of U.S. patent application Ser. No. 11/864,962 filed Sep. 29, 2007, now U.S. Pat. No. 7,938,960, which claims the benefit of U.S. Provisional Patent Application Ser. No. 60/827,569 filed Sep. 29, 2006, the contents each of which are incorporated herein by reference thereto.

STATEMENT REGARDING FEDERALLY SPONSORED RESEARCH OR DEVELOPMENT

Embodiments of this invention may have been made with governmental support under Contract No. DE-FC26-02NT41219. Therefore, the U.S. Government may have a paid-up license to portions or embodiments of this invention and the right in limited circumstances to require the patent owner to license to others on reasonable terms as provided for by the terms, of Contract No. DE-FC26-02NT41219.

BACKGROUND

Exemplary embodiments of the present invention relate to a fuel filter and method for the removal of sulfur containing compounds from a post-refinery fuel stream more particularly exemplary embodiments relate to a fuel filter and method for the removal of sulfur containing compounds wherein the filter provides an additive to the fuel.

There continues to be environmental concern relating to air pollution stemming from use of internal combustion engines, especially those used in transportation applications such as cars, trucks, boats and the like, and stationary power sources such as diesel generators and the like. In addition to being a direct source of pollution in the form of SOx, sulfur also poisons the catalytic surface of exhaust after treatment devices. By reducing sulfur in the fuel and therefore the exhaust, the useful life of exhaust after treatment devices is extended. In addition, and since many internal combustion engines employ an exhaust gas recirculation system there is also a desire to remove the sulfur from the exhaust gas.

New power sources such as fuel cells will also require fuel streams to have similar or lower levels of sulfur. Fuel cells burn hydrogen that has been reformed from various hydrocarbon fuels, such as gasoline. Sulfur will poison the active surfaces of the fuel cell, thus shortening its life.

As a result, various governments and regulatory bodies continue to enact legislation intended to substantially lower the acceptable levels of sulfur and sulfur containing compounds present in the fuels used in internal combustion engines.

The U.S. EPA, for instance, has enacted regulations requiring diesel fuel producers to phase in the production of low sulfur diesel fuel (equal to or less than 15 ppm sulfur) beginning in 2006 and ending in 2010. Similarly, from 2004 to 2006, gasoline sulfur levels were reduced from 50 ppm to 30 ppm. The need for commercially available fuels having continually lower levels of sulfur containing compounds creates new problems for manufacturers of such fuels, i.e., the refining industry.

The introduction of low-sulfur diesel fuels has also caused problems with fuel-injection equipment because the fuel's lubricating properties were reduced by the hydrotreating process needed to lower the sulfur content. The majority of the fuel-lubricated distributor injection pumps for passenger cars and small trucks showed increase wear if the low-sulfur diesel fuel is not treated with lubricant additives. Increased wear reduced the injection pump's service life and caused engine power loss, higher emissions, and fuel consumption, poor driveability, and difficulties when starting.

Adding lubrication additives to the diesel fuels appears to be the only viable solution for overcoming the aforementioned problems.

Additionally, there are issues with the incompatibilities with additized diesel fuel in pipelines when a jet-fuel is also transported in the same pipelines. Consequently additization will have to be done after the fuel is distributed and after the refinery.

Furthermore and since the refined diesel fuel still has some sulfur in it there is a desire to provide a fuel filter in the system of an internal combustion engine or other device wherein the fuel filter is configured to further reduce the sulfur content of the fuel. For example, one approach for removing the sulfur from the fuel is to place an adsorbant in a filter positioned to filter the fuel stream however, these adsorbants may also filter out desired properties or additives of the fuel namely, lubrication additives which were added to the fuel to address the aforementioned issues associated with low sulfur diesel fuels.

Accordingly, it is desirable to provide a fuel filter that delivers lubricating additives to the fuel.

SUMMARY OF THE INVENTION

Disclosed herein are fuel filters and processes for removing sulfur-containing compounds from a post refinery fuel stream.

In one exemplary embodiment, a fuel filter is provided wherein the fuel filter provides lubricant additives to the fuel being filtered.

In another exemplary embodiment, a fuel filter is provided wherein the fuel filter removes sulfur containing compounds from the fuel and the fuel filter provides lubricant additives to the fuel after is has been filtered.

In accordance with one exemplary embodiment a method for adding a lubricating additive to a diesel fuel is disclosed, the method comprising: passing the diesel fuel through a fuel filter comprising an adsorbent configured to remove sulfur from the diesel fuel; and releasing a lubricant or lubricity additive into the diesel fuel after it has passed through the adsorbent.

In accordance with another exemplary embodiment, a system for controlling the release of a fuel additive into a diesel fuel is provided, the system having: a housing having at least one inlet opening and at least one outlet opening configured to define a flow path therethrough; filter media disposed in the flow path, the filter media comprising an adsorbent that removes sulfur containing compounds from diesel fuel passing through the housing; an additive cartridge configured to disperse a lubricating additive into the diesel fuel; a controller for controlling the amount of lubricating additive that is released from the additive cartridge into the diesel fuel; and at least one sensor configured to monitor the lubricant additive content in the diesel fuel and provide a signal indicative of the lubricant additive content in the diesel fuel to the controller, wherein the controller releases the additive from the additive cartridge based upon the signal received from the at least one sensor.

DETAILED DESCRIPTION OF EXEMPLARY EMBODIMENTS

Figure 1:
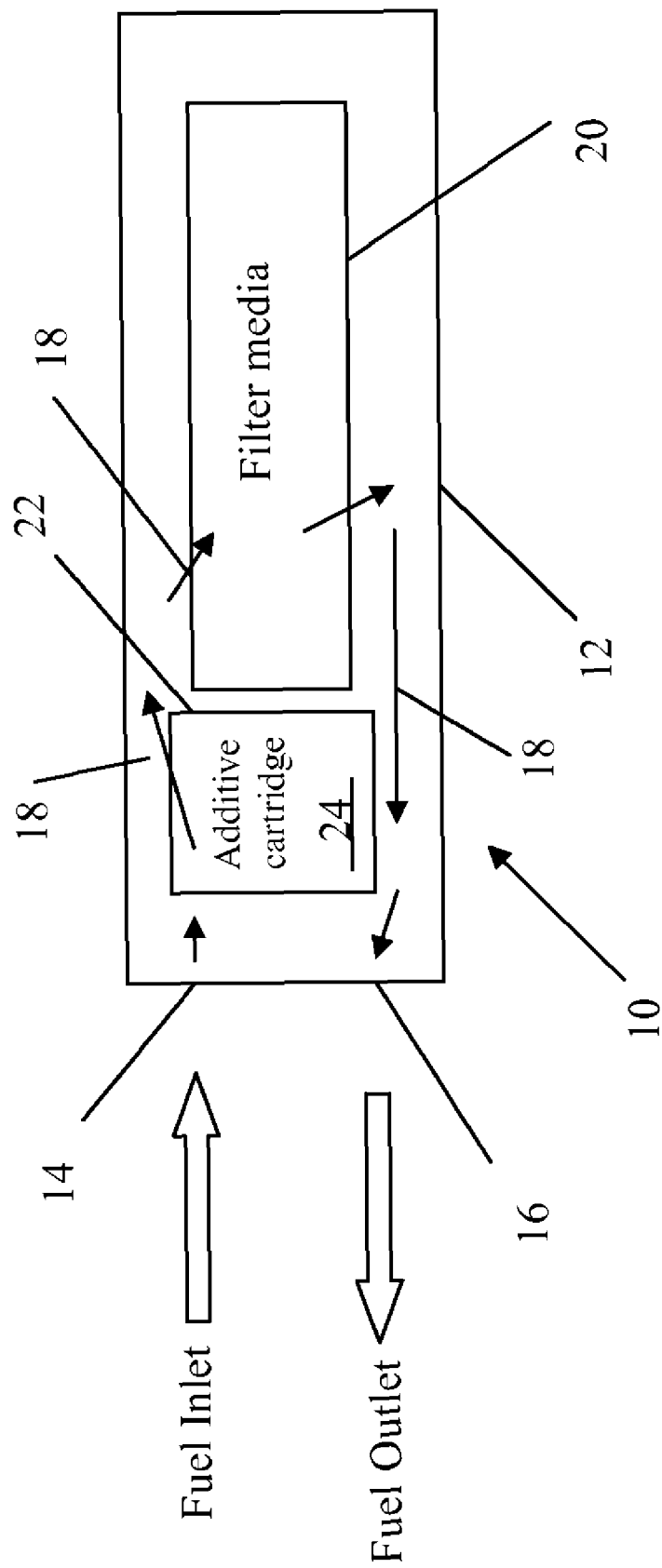
FIGS. 1-3 are schematic illustrations of fuel filters in accordance with exemplary embodiments of the present invention.

This application is related to the following U.S. patent application Ser. Nos., 11/081,796, filed Mar. 15, 2005, and 11/674,913, filed Feb. 14, 2007, the contents each of which are incorporated herein by reference thereto.

Disclosed herein is a fuel filter that is capable of providing lubricant additives to a fuel being filtered by the filter. In another exemplary embodiment, the fuel filter is also configured to remove sulfur containing compounds from a post refinery fuel stream.

The term "post refinery fuel stream" or "post refinery fuel" as used herein refers to a fuel or fuel stream (used interchangeably herein) that is manufactured by a petroleum refinery. In one exemplary embodiment, post refinery fuel refers to a fuel manufactured by a petroleum refinery employing at least one sulfur removing technology. In one embodiment, a post refinery fuel stream will comprise sulfur containing compound in a concentration of no more than 2000 ppm. In another embodiment, a post refinery fuel stream will comprise sulfur-containing compounds in a concentration of no more than 100 ppm. In one exemplary embodiment, a post refinery fuel stream will comprise sulfur-containing compound in a concentration of no more than 15 ppm. In one embodiment, a post refinery fuel stream contains a population of sulfur species present as various substituted alkyl, benzo, and dibenzothiophenes.

As used herein 'fuel filter' is intended in one embodiment to describe a fuel filter designed to remove sulfur-containing compounds found in fuels. It is also understood that in accordance with exemplary embodiments a separate fuel filter may be provided to remove contaminants from the fuel (e.g., a typical of non-sulfur removing fuel filter). Alternatively, a single fuel filter configured for both removal of sulfur-containing compounds and filtering of other contaminants is contemplated to be within the scope of alternative embodiments of the disclosed fuel filters and methods of using the same. In any of the aforementioned arrangements exemplary embodiments of the present invention are directed to a fuel filter, which is also configured to provide a lubricating additive to the fuel. As used herein "lubricating additive" refers to an additive added to the refined fuel in order to overcome the deleterious effects of the de-sulfurization process, non-limiting examples of "lubricating additives" include but are not limited to amides, esters and acids. It will be understood that lubricants suited for use as fuel lubricating additives for internal combustion engines, are lubricants comprising amides, esters, acids, or a combination comprising two or more of the foregoing. It is advantageous that the lubricants have a viscosity or flash point suitable for use in an internal combustion engine.

Non-limiting examples of lubricating additives for diesel fuel are found in the following U.S. Pat. Nos. 6,562,086; 6,361,573; 6,187,939; 6,080,212; 5,997,593; and 5,853,436 the contents each of which are incorporated herein by reference thereto.

The disclosed fuel filters and methods can be used with power sources such as internal combustion engines and fuel cells employed in both stationary systems and motor vehicles. Illustrative examples of internal combustion engines include gasoline powered engines and diesel engines.

The disclosed fuel filters and methods are generally suitable for use with fuel cells having an anode, a cathode, and an electrolyte in between the two electrodes wherein typically an oxidation reaction (e.g., $H_2 \rightarrow 2H^+ + 2e$) takes place at the anode and a reduction reaction (e.g., $O_2 + 2H_2O + 4e \rightarrow 4OH^-$) takes place at the cathode.

Illustrative examples of fuel cells include Proton Exchange Membrane or Polymer Electrolyte Membrane (PEM) fuel cells, phosphoric acid (PA) fuel cells, molten carbonate (MC) fuel cells, solid oxide (SO) fuel cells, and alkaline fuel cells.

Illustrative examples of stationary systems include generators and power plants.

Illustrative examples of motor vehicles include cars, trucks, boats, personal water craft, semi-trucks, construction devices such as bulldozers and cranes, small engine devices such as lawn mowers and tractors, and the like.

In one embodiment, the fuel filter for removing or reducing the concentration of sulfur containing compounds will be installed on such motor vehicles such that any fuels introduced into the vehicle must pass through the fuel filter before entering the internal combustion engine. In such applications, the fuel filter for removing sulfur-containing compounds, i.e., a sulfur reducing or removing fuel filter may be referred to as an on-board vehicle sulfur polishing or desulfurization component or process.

In one exemplary embodiment, the sulfur removing filter will be used as an on-board vehicle desulfurization component that may also be a part of an emission control system wherein the filter releases captured sulfur containing compounds into the fuel stream during a regeneration process of a NOx adsorber, wherein the regeneration of the NOx adsorber is conducted in accordance with technologies known to those skilled in the related arts.

In addition, the disclosed fuel filters and methods can be used in traditional fuel distribution systems that distribute post refinery fuel streams.

Such fuel distribution systems may be characterized by (i) a refinery that manufactures the post refinery fuel stream, (ii) one or more interim storage devices, and (iii) one or more fuel consuming articles or vehicles having a power source that requires refueling. Illustrative examples of interim storage devices include underground and above ground storage tanks, tanker trucks, fuel discharge or dispensing devices, connecting piping, and the like. Fuel consuming articles or vehicles having a power source that consumes fuel include the descriptions above for motor vehicles and stationary systems.

Illustrative post-refinery fuel streams include gasoline, kerosene, heating oil, jet fuel, cracked-gasoline or diesel fuel. In one exemplary embodiment, the fuel will be diesel fuel.

The term "gasoline" denotes a mixture of hydrocarbons boiling in the range of from about 100 degrees Fahrenheit to about 400 degrees Fahrenheit, or any fraction thereof. Examples of suitable gasoline include, but are not limited to, hydrocarbon streams in refineries such as naphtha, straight-run naphtha, coker naphtha, catalytic gasoline, naphtha, alkylate, isomerate, reformate, and the like and combinations thereof.

The term "cracked-gasoline" denotes a mixture of hydrocarbons boiling in the range of from about 100 degrees Fahrenheit to about 400 degrees Fahrenheit, or any fraction thereof, that are products from either thermal or catalytic processes that crack larger hydrocarbon molecules into smaller molecules. Examples of suitable thermal processes include, but are not limited to, coking, thermal cracking, visbreaking, and the like and combinations thereof. Examples of suitable catalytic cracking processes include, but are not limited to, fluid catalytic cracking, heavy oil cracking, and the like and combinations thereof. Thus, examples of suitable cracked-gasoline include, but are not limited to, coker gasoline, thermally cracked gasoline, fluid catalytically cracked gasoline, heavy oil cracked gasoline, and the like and combinations thereof.

The term "diesel fuel" denotes a mixture of hydrocarbons boiling in the range of from about 300 degrees Fahrenheit to about 750 degrees Fahrenheit, or any fraction thereof. Examples of suitable diesel fuels include, but are not limited to, light cycle oil, kerosene, jet fuel, straight-run diesel, hydrotreated diesel, and the like and combinations thereof.

The sulfur containing compounds removed by the disclosed fuel filter may in general be any sulfur containing compound normally found in fuels intended for use in internal combustion engines. The disclosed fuel filters may remove one or more of such compounds from a fuel stream.

The term "sulfur" or "sulfur containing compound" denotes sulfur in any form such as elemental sulfur or a sulfur compound normally present in a hydrocarbon-containing fluid such as cracked gasoline or diesel fuel. Examples of sulfur which can be present during a disclosed process, include, but are not limited to, hydrogen sulfide, carbonyl sulfide (COS), carbon disulfide ($CS_2$), mercaptans (RSH), organic sulfides (R—S—R), organic disulfides (R—S—S—R), thiophene, substituted thiophenes, organic trisulfides, organic tetrasulfides, benzothiophene, alkyl thiophenes, alkylated benzothiophenes, dibenzothiophenes, alkylated dibenzothiophenes, and the like and combinations thereof as well as the heavier molecular weights of same which are normally present in a diesel fuel of the types contemplated for use in a process of the present invention, wherein each R can be an alkyl or cycloalkyl or aryl group containing one carbon atom to ten carbon atoms.

In one exemplary embodiment, the sulfur-containing compounds removed by the disclosed filter or process will be sulfur containing aromatic compounds. In one embodiment, the sulfur containing compounds removed by the disclosed fuel filter include benzothiophene, dibenzothiophene, and derivatives thereof.

In one embodiment, the disclosed fuel filters and methods are suitable for use with the interim storage devices of a traditional fuel distribution system. It will be appreciated that such methods and fuel filters may be employed at numerous locations within such interim storage devices. For example, a fuel desulfurization filter could be incorporated into the dispensing device at the point of use or at the entrance or exit of an interim storage device. In another embodiment, a fuel desulfurization filter could be incorporated at one or more central distribution points.

The disclosed fuel filters are also suitable for use with commercially available post refinery fuels directly inserted into motor vehicles by a vehicle operator through a fuel intake opening in the vehicle. In one exemplary embodiment, the post refinery fuels will be unadulterated, that is, they will not be subject to any pretreatment steps prior to passing through the disclosed fuel filters except for those employed by the original manufacturing refinery. Such fuels may be referred to as unadulterated post refinery fuels.

Fuels or fuel streams that pass through the disclosed fuel filters and methods may be referred to as 'clean fuels' or 'polished fuels'.

In one embodiment, the unfiltered or 'contaminated' post refinery fuel streams may comprise sulfur concentrations of from about 6 ppm to 500 ppm. In another embodiment, the disclosed filters and method may be used with post refinery fuel streams having sulfur concentrations of from about 15 ppm or less. In one exemplary embodiment, the disclosed filters and method may be used with post refinery fuel streams having sulfur concentrations of from about 9 ppm or less. In one embodiment, the disclosed filters and method may be used with refinery fuel streams having sulfur concentrations of from about 6 ppm to about 15 ppm.

In one embodiment, the disclosed method will result in filtered or clean fuel streams having a reduced concentration of sulfur; especially sulfur concentrations of 3 ppm or less.

In accordance with an exemplary embodiment of the present invention the disclosed fuel filters may comprise an adsorbent comprising an inorganic oxide having a surface acidity characterized by a $pK_a$ of less than or equal to −3. In one embodiment, the disclosed fuel filters will comprise an adsorbent consisting essentially of an inorganic oxide having a surface acidity characterized by a $pK_a$ of less than or equal to −3.

The term "inorganic oxide" as used herein refers to porous materials having pores large enough to adsorb sulfur-containing aromatic compounds.

In one embodiment, the inorganic oxides may be characterized by a surface area of at least 50 $m^2/g$ while in another embodiment, the inorganic oxides may be characterized by a surface area of from about 150 $m^2/g$ to about 500 $m_2/g$.

In one embodiment, suitable inorganic oxides will have pores in excess of 50 angstroms.

Illustrative examples of suitable inorganic oxides include alumina, kaolinite (either sodium, ammonium or hydrogen forms), montmorillonite (either sodium, ammonium or hydrogen forms), silca magnesia, alumina-boria, activated alumina, zeolites, aluminosilicates, silica gels, clay, active clay, silica gel, silicon dioxide, mesoporous silica porous material (FSM), silica alumina compounds, silica, alumina phosphate compounds, super acids, super acids-sulfated, titania, sulfated zironia, titanium dioxide, hafnium oxide, and mixtures thereof and the like. In one exemplary embodiment, suitable inorganic oxides will be at least one of alumina, zeolite, silica alumina compounds, silica, alumina phosphate compounds, super acids, silica gels, titanates, zironia, titanium dioxide, hafnium oxide, and mixtures thereof.

In one especially exemplary embodiment, the inorganic oxide will be alumina. The term "alumina" as used herein refers to $Al_2O_3$.

Although many types and phases of alumina are suitable for use in the disclosed fuel filters and methods, in one embodiment, the inorganic oxide will be at least one of gamma alumina, eta alumina, and mixtures thereof.

However, not withstanding the foregoing, only those inorganic oxides having a surface acidity characterized by a $pK_a$ of less than or equal to −3 are suitable for use in the disclosed fuel filters and methods.

It will be appreciated that the term "surface acidity" as used herein refers to a surface that has an acidity measurable by visual color change via an acid base indicator such as dicinnamalacetone.

In one embodiment, the disclosed fuel filters will comprise an adsorbent comprising, consisting essentially of, or consisting of an inorganic oxide having a surface acidity characterized by a $pK_a$ of least −3. In one embodiment, the disclosed fuel filters will comprise an adsorbent comprising, consisting essentially of, or consisting of an inorganic oxide having a surface acidity characterized by a $pK_a$ of least −6. In another embodiment, the disclosed fuel filters will comprise an adsorbent comprising, consisting essentially of, or consisting of an inorganic oxide having a surface acidity characterized by a pK$_a$ of least −8. In another embodiment, the disclosed fuel filters will comprise an adsorbent comprising, consisting essentially of, or consisting of an inorganic oxide having a surface acidity characterized by a pKa of from about −3 to about −8. It will be appreciated the function of the adsorbent is the adsorption and removal of sulfur-containing compounds from a fuel stream.

Suitable inorganic oxides may be obtained by the calcination of an otherwise suitable inorganic oxide. In one embodiment, otherwise suitable inorganic oxides will those be inorganic oxides which lack the requisite surface acidity but which are otherwise as described above. In one exemplary embodiment, suitable inorganic oxides will be obtained by the calcination of inorganic oxides which lack the requisite surface acidity but which are otherwise as described above and which are commercially available.

In one embodiment, suitable inorganic oxides will be obtained by heating a commercially available and otherwise suitable inorganic oxide to a temperature of at least 550° C. In another embodiment, suitable inorganic oxides will be obtained by heating an otherwise suitable and commercially available inorganic oxide to a temperature of from 300 to 500° C. In one exemplary embodiment, suitable inorganic oxides will be obtained by heating an otherwise suitable and commercially available inorganic oxide to a temperature of from 400 to 450° C. under a flow of nitrogen. After preparation, the sorbent may be stored under dry nitrogen until use.

It will be appreciated that the disclosed absorbents may in one embodiment comprise metals and metal oxides such as Group VIIIA metals, Group IVA, Group IVB and the like.

However, in one embodiment, the disclosed adsorbents may optionally be untreated with any metals or metal oxides other than those discussed above in the context of inorganic oxides. That is, in one embodiment, the disclosed adsorbents will consist essentially of the inorganic oxide having a surface acidity characterized by a pK$_a$ of less than or equal to −3. In another exemplary embodiment, the disclosed adsorbents will consist essentially of an inorganic oxide having a surface acidity characterized by a pK$_a$ of less than or equal to −3 and that is substantially free of the metals and metal oxides traditionally employed as desulfurization catalysts or absorbents. In another exemplary embodiment, the disclosed adsorbents will consist essentially of an inorganic oxide having a surface acidity characterized by a pK$_a$ of less than or equal to −3 and that is substantially free of the metals and metal oxides such as Group VIIIA metals, Group IVA, Group IVB and the like.

Figure 2:
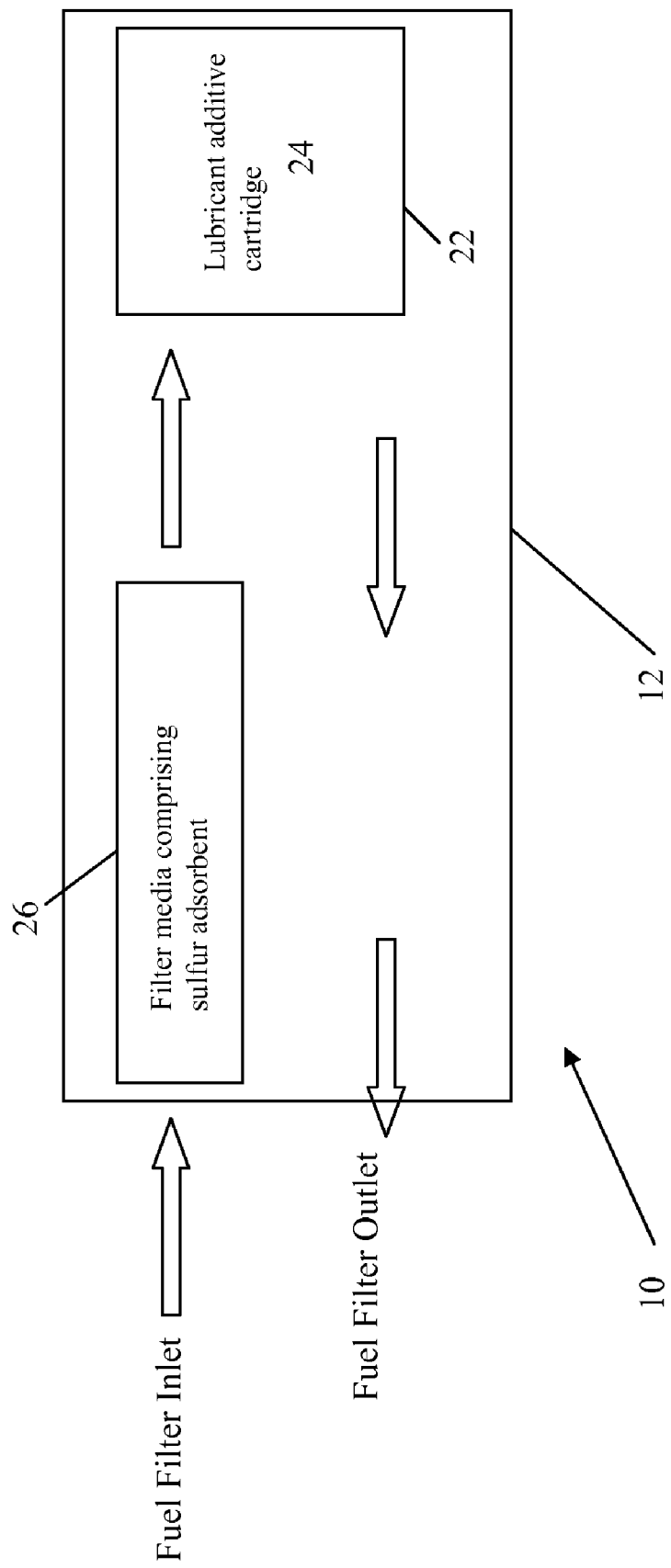

Referring now to FIGS. 1 and 2, a non-limiting example of a fuel filter 10 constructed in accordance with an exemplary embodiment is illustrated. In accordance with an exemplary embodiment, the fuel filter is a diesel fuel filter. Here fuel filter 10 comprises a housing 12 configured to have at least one inlet opening 14 and at least one outlet opening 16 to define a flow path 18 therethrough.

In accordance with one exemplary embodiment (FIG. 1) the fuel filter will comprise filter media 20 which is configured to filter fuel. In accordance with an exemplary embodiment of the present invention the filter media comprises an adsorbent configured to remove sulfur from the fluid passing through the filter.

Filter 10 also comprises an additive cartridge 22, which contains a lubricant additive or lubricity additive 24 to be dispersed into the fuel. Thus, cartridge 22 provides a means for adding the lubricity agent back into the fuel.

In addition to media 20 and in an alternative exemplary embodiment (FIG. 2) an adsorbent material 26 is positioned in the flow path 18 to also filter the fuel, namely remove sulfur from the fuel. Non-limiting examples of adsorbent material 26 are found in U.S. patent application Ser. No. 11/674,913, filed Feb. 14, 2007, the contents of which are incorporated herein by reference thereto.

In the embodiment illustrated in FIG. 2, the additive cartridge 22 is positioned in the flow path to disperse the lubricity additive into the fuel after the fuel has been filtered by adsorbent material 26 so that the lubricant or lubricity additive is not scrubbed from the fuel. In accordance with exemplary embodiments of the present invention and regardless of the location of the additive cartridge (e.g., before are after the adsorbent material) the additive cartridge can have the same configuration as those illustrated in the following U.S. Provisional Patent Applications Ser. No. 60/889,728 filed Feb. 13, 2007 and Ser. No. 60/910,772 filed Apr. 9, 2007, the contents each of which are incorporated herein by reference thereto. Another non-limiting configuration of the additive cartridge is also illustrated in U.S. patent application Ser. No. 11/846,265 filed Aug. 28, 2007, the contents of which are also incorporated herein by reference thereto.

Figure 3:
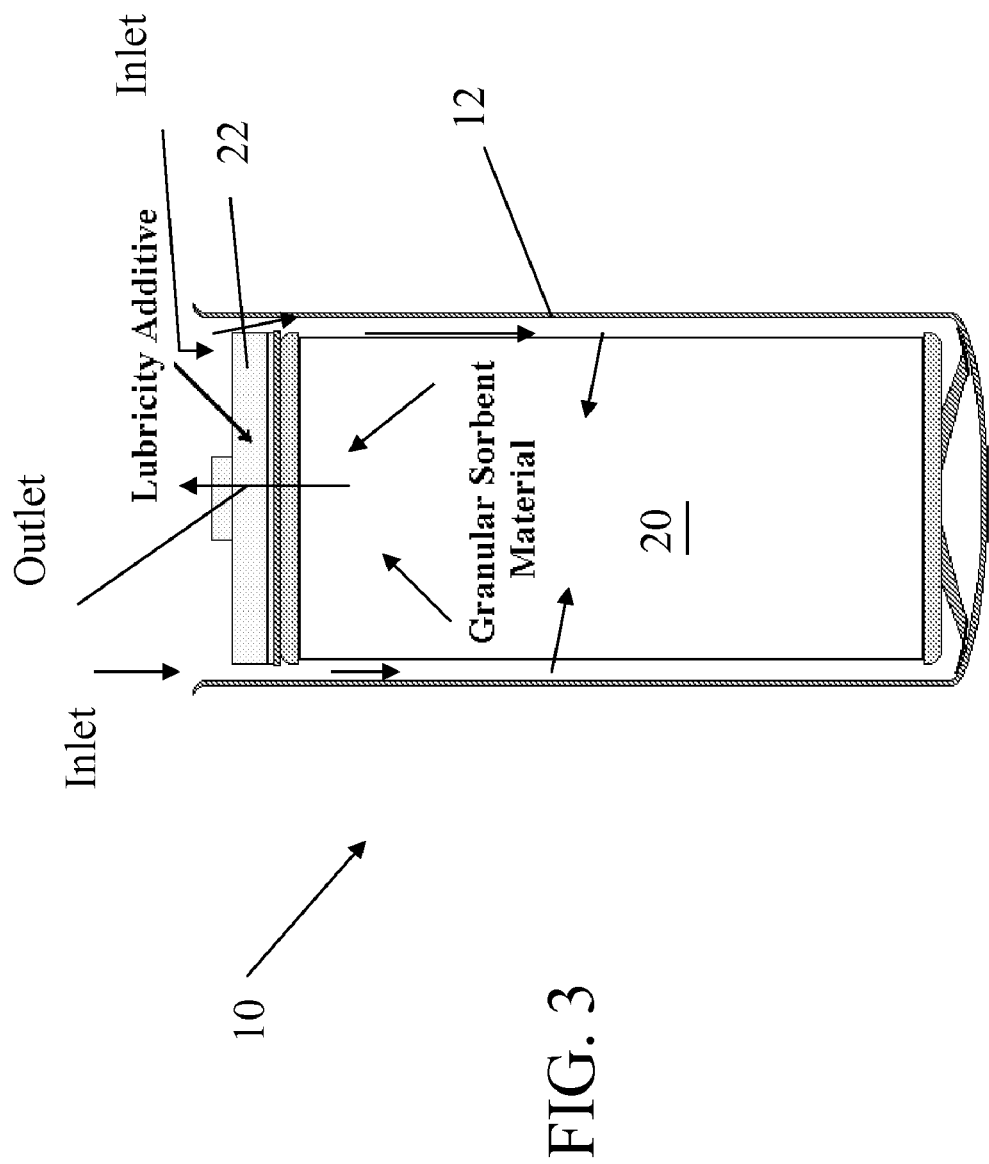

In one exemplary embodiment, the additive cartridge is located within the fuel filter or alternatively, the additive cartridge is in fluid communication with a fluid flow path of a fuel circuit (e.g., a system comprising a separate fuel filter and a separate additive cartridge each in fluid communication with a fuel stream), wherein the lubricity additive is slowly metered out into the fuel stream or it is pumped out or released by a value into the fuel stream when a signal is received from a sensor configured to detect levels of the lubricating additives in the fuel. Another non-limiting filter configuration is illustrated in FIG. 3.

In accordance with an exemplary embodiment, additive cartridge 22 may comprise a plurality of openings in order to disperse the additive, which may be in any form (e.g., liquid, gel, solid, pellets, etc.). Alternatively and referring now to FIG. 4, additive cartridge 22 may also comprise a metering pump and/or acuatable valve 30 for metering of the additive. In this embodiment, the fuel filter may be a component of a system 40 having a plurality of sensors or a single sensor 50 monitoring the lubricant additive content in the fuel. Accordingly and when a predetermined level is detected the pump or valve is activated/opened to disperse the additive. The predetermined level corresponds to a state of the sensed fuel wherein the lubricating additives are below a desired level.

Figure 4:
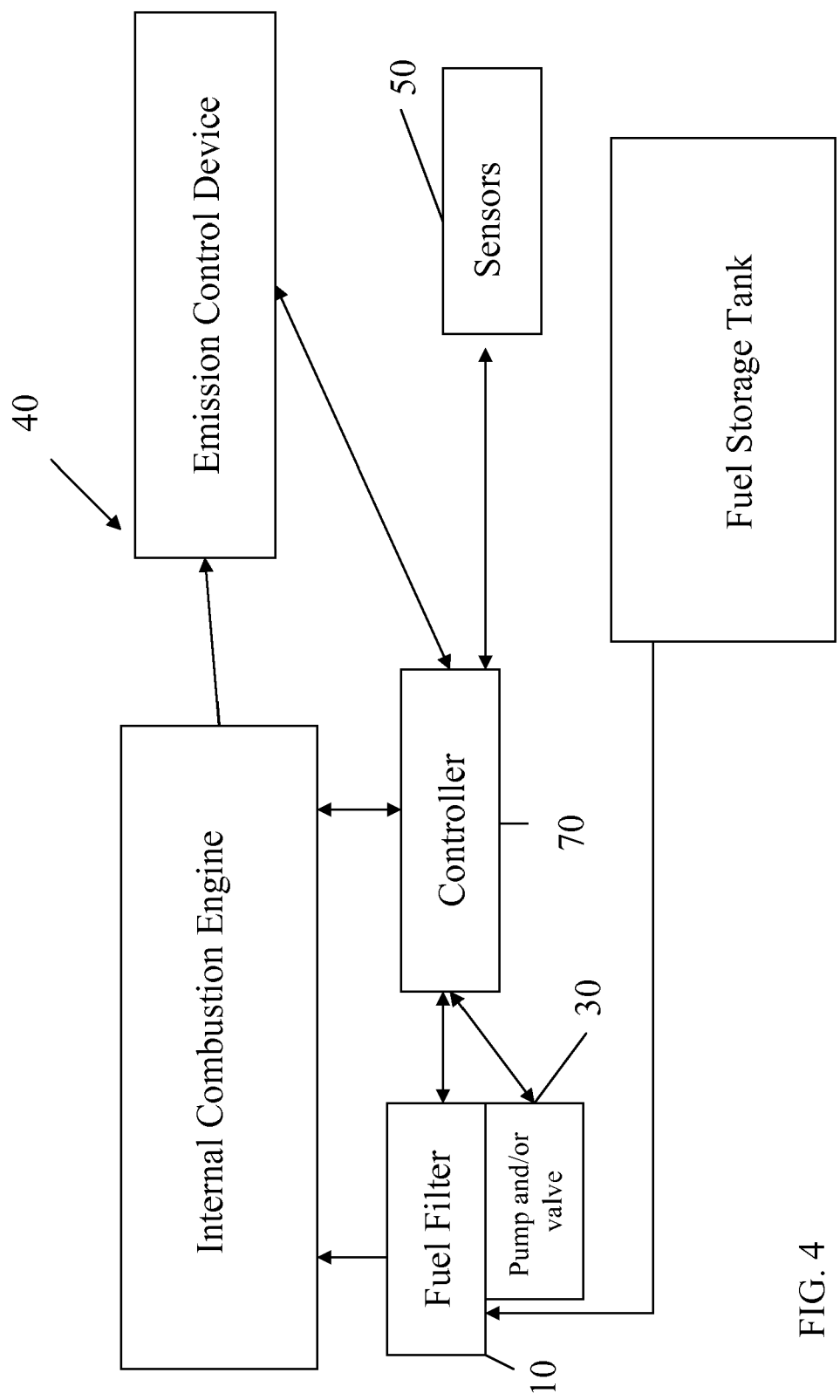
FIG. 4 is a schematic illustration of an alternative exemplary embodiment of the present invention.
Figure 5:
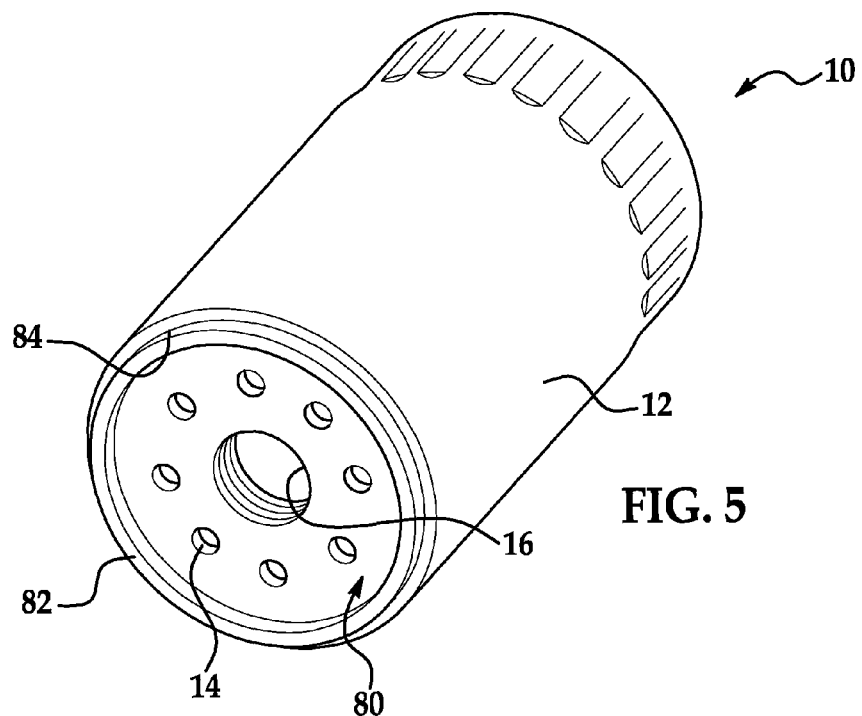
FIGS. 5-8C illustrate fuel filters and lubricity additive cartridges constructed in accordance with alternative exemplary embodiments of the present invention.
Figure 6:
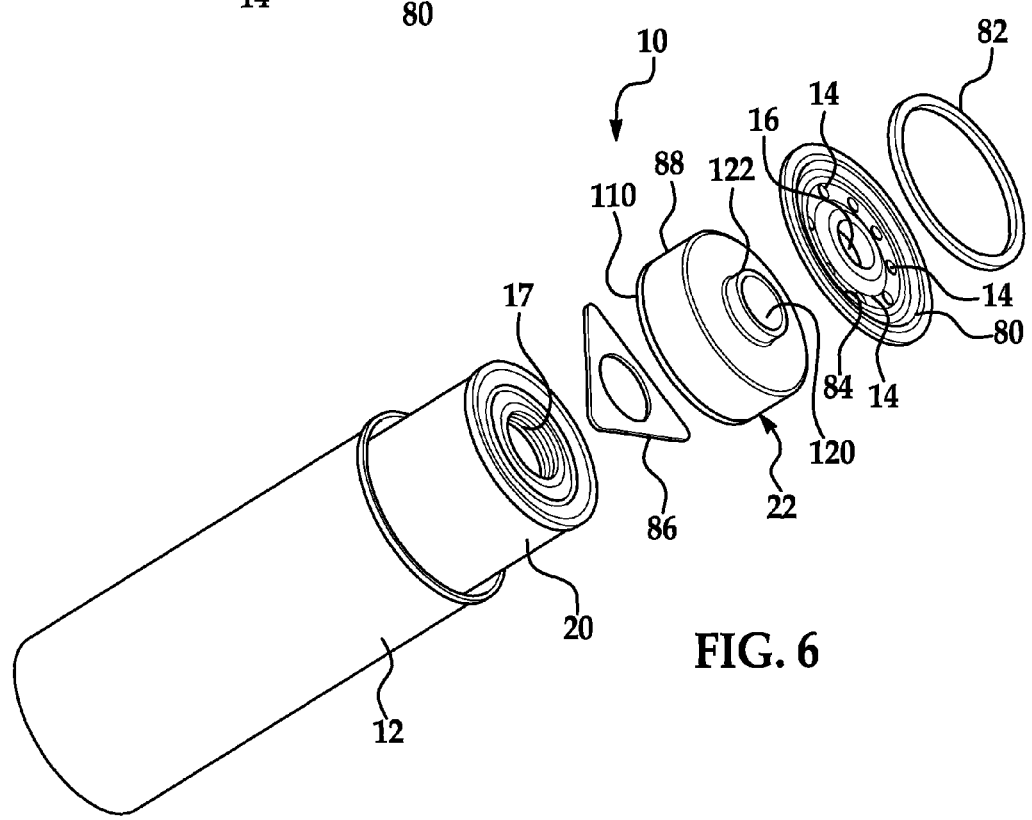

Alternatively, and as illustrated by the dashed lines in FIG. 4, the additive cartridge may be a separate component in fluid communication with fluid flow through the system wherein the lubricating additive is slowly released into the fuel or is pumped into the fuel or an actuatable valve is opened to release the additive into the fuel. In this embodiment, the additive cartridge is separately removable from the fuel circuit in order to allow for replenishment of the additive in the additive cartridge.

In one exemplary embodiment, the additive cartridge is located in the fuel filter and the same is removed and replaced with the fuel filter. As discussed above, the fuel filter may further comprise a pump or actuatable valve that receives commands or signals from a controller to release the additive into the fuel passing through the filter. In yet another alternative the additive cartridge is located within the fuel filter and the same is configured to slowly meter out the additive into the fuel. In this embodiment, the additive cartridge may be upstream or downstream from the adsorbent of the filter media.

In one exemplary embodiment, the apparatus, method or means for monitoring and controlling the release of lubricating additive is an on-board control apparatus comprising a plurality of sensors 50 each providing signals to a microprocessor or controller 70 comprising programmable logic that is configured to receive signals from the plurality of sensors and provide signals to the fuel filter in order to release the additives in the fuel stream wherein the same can be received into the fuel stream without being filtered out by the sulfur removing filter.

It is understood that a controller operating in response to a computer program may implement the processing of the above description. In order to perform the prescribed functions and desired processing, as well as the computations therefore, the controller may include, but not be limited to, a processor(s), computer(s), memory, storage, register(s), timing, interrupt(s), communication interfaces, and input/output signal interfaces, as well as combinations comprising at least one of the foregoing.

As described above, algorithms for implementing exemplary embodiments of the present invention can be embodied in the form of computer-implemented processes and apparatuses for practicing those processes. The algorithms can also be embodied in the form of computer program code containing instructions embodied in tangible media, such as floppy diskettes, CD-ROMs, hard drives, or any other computer-readable storage medium, wherein, when the computer program code is loaded into and executed by a computer and/or controller, the computer becomes an apparatus for practicing the invention. Existing systems having reprogrammable storage (e.g., flash memory) that can be updated to implement various aspects of command code, the algorithms can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer. When implemented on a general-purpose microprocessor, the computer program code segments configure the microprocessor to create specific logic circuits.

These instructions may reside, for example, in RAM of the computer or controller. Alternatively, the instructions may be contained on a data storage device with a computer readable medium, such as a computer diskette. Or, the instructions may be stored on a magnetic tape, conventional hard disk drive, electronic read-only memory, optical storage device, or other appropriate data storage device. In an illustrative embodiment of the invention, the computer-executable instructions may be lines of compiled C++ compatible code.

In an exemplary embodiment the controller includes logic for evaluating signals from the plurality of sensors to determine if the lubricating additive in the fuel filter is to be released into the fuel stream. In one non-limiting embodiment, a means for controlling the release of the sulfur will comprise a circuit and sensor for identifying a predetermined level of lubricating additive.

Referring now to FIGS. 5-8, there is shown a fuel filter 10 according to a non-limiting exemplary embodiment of the invention. The fuel filter generally includes a hollow cylindrical housing 12 which defines a hollow chamber therein, wherein media 20 is disposed in the chamber, and an additive cartridge or dispersement device 22 is also retained inside the housing chamber.

In one embodiment, the housing also includes a base plate 80 sealingly attached to the case or housing. A foraminous center tube may, optionally, be provided within the filter housing to supportively reinforce media 20 thereon.

The housing base plate includes a plurality of inlet ports comprising inlet path 14 and the base plate also includes a central outlet port defining outlet path 16. In one non-limiting embodiment, the outlet port has a plurality of female threads formed therein, to allow rotatable mounting of the filter on an externally threaded hollow tubular fitting (not shown). If necessary, an annular external seal or gasket 82 fits engagingly into a groove formed at the bottom surface of the base plate, to resist leakage outwardly from the base of the filter.

In addition and in one embodiment, a gasket 86 is disposed between the additive cartridge or basket 24 and the filter media 20.

In one non-limiting exemplary embodiment, the additive cartridge includes a housing portion 88 having a first chamber 90 and a second chamber 92. First chamber 90 is separated from second chamber 92 by a pair of dividing walls 94 and 96. In one embodiment a liquid additive is disposed in chambers 90 and 92. A metering opening 98 is provided to allow the additive of first chamber 90 to pass therethough during usage of the filter. In accordance with an exemplary embodiment metering opening configured to meter out the additive. Thus, the additive is slowly metered out over the useful life of the filter. Furthermore, a single opening may be provided or multiple openings may be provided for fluid communication to chamber 90.

Similarly a metering opening 100 is provided to allow the additive of second chamber 92 to pass therethough during usage of the filter. In accordance with an exemplary embodiment metering opening configured to meter out the additive. Thus, the additive is slowly metered out over the useful life of the filter. Furthermore, a single opening may be provided or multiple openings may be provided for fluid communication to chamber 92.

In accordance with one exemplary embodiment, chamber 90 comprises one lubricity additive and chamber 92 comprises another lubricity additive or another fuel additive, each being distinct from one another.

Of course, other configurations are contemplated in accordance with exemplary embodiments of the present invention. For example, the housing may be configured to have multiple chambers and multiple metering holes. Alternatively, the housing may be configured to have only a single chamber and a single metering hole or plurality of metering holes thus only one additive is provided by the single chamber of the additive cartridge or dispersement device.

In accordance with an exemplary embodiment of the present invention the additive or additives are any one of liquids, gels, pellets, combinations thereof or equivalents thereof. In one exemplary embodiment, the metering openings are sealed with a fuel soluble material such that the same become dislodged from the metering openings during use of the fuel filter. Moreover, sealing of the openings allows the additives to be placed in the cartridge during assembly and filling of the cartridge.

Figure 7A:
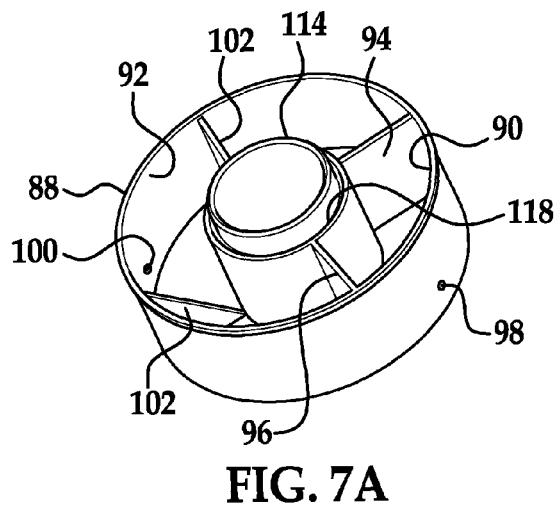
Figure 7B:
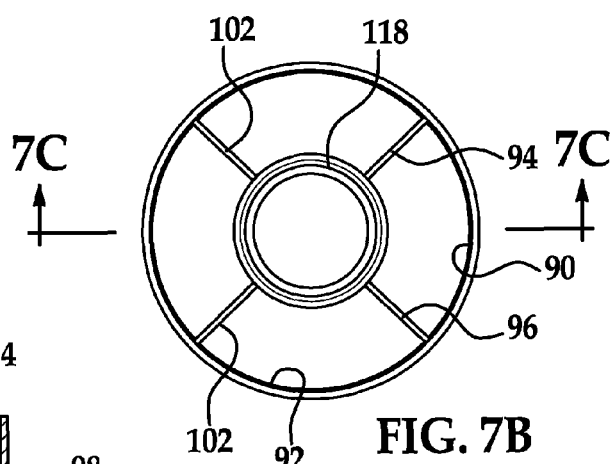
Figure 7C:
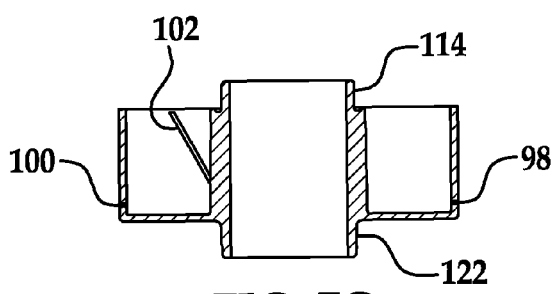

As illustrated in FIGS. 7A-7C, the second chamber 92 is larger than the first chamber 90 thus, structural ribs 102, if necessary, are located in the second chamber. Alternatively, second chamber 92 is constructed without structural ribs 102. Accordingly, a larger amount of additive can be placed in the second chamber as opposed to the first chamber. The structural ribs are angled such that they will not interfere with the fluid flow of the additive from the chamber. In other words, the structural ribs at one point will terminate at a bottom surface of the housing (e.g., opposite cap 112), which is proximate to the metering opening(s). Furthermore and as applications require the size of the chambers or chamber may vary as the required amounts of the additives varies.

In addition, the housing has neck portions on either side of the housing for engagement with the outlet opening of the base plate and the center opening of the filter media. This will allow for ease of placement as well as providing a fluid seal for fluid transfer through the dispersement housing.

In accordance with an exemplary embodiment of the present invention, the housing will have a neck portion 122 that depends away from the housing such that when the same is fluidly sealed to the outlet opening of the base plate 80 a gap is maintained between a surface of the additive cartridge and the inlet openings of the base plate in order allow fluid flow over the top of the additive cartridge and then along the side walls of the cartridge containing the metering opening or openings and then through the filter media and then ultimately out the outlet opening of the filter. In one embodiment, an outlet path 120 is positioned in the additive cartridge and is in fluid communication with the outlet path of the filter. Accordingly, and as fluid flows the metering opening or opening additive stored in the dispersement device is released into fluid or fuel flowing past the additive cartridge or dispersement device.

It being understood that the outer periphery of the additive cartridge and the filter media are slightly smaller than the inner dimension of the housing of the filter such that fluid flowing into the inlet openings passes through a gap between the top of the additive cartridge and the base plate and then into a gap or flow path defined by the outer periphery of the housing of the additive cartridge and the outer periphery of the filter media and the inner dimension of the housing of the filter, wherein the fluid then flows into the filter media and back out of the filter housing via the outlet path defined by openings in the filter housing and if applicable the filter media and the additive cartridge. In one non-limiting exemplary embodiment, the outer periphery of the filter media and the housing of the additive cartridge are substantially the same thus making insertion of the filter media and the dispersement device or additive cartridge into the housing simple. Furthermore, there is no requirement to resize the filter housing to accommodate the additive cartridge. For example, an existing filter housing design without an additive cartridge may be used by simply reducing the length of the filter media to accommodate for the height of the additive cartridge.

Figure 8A:
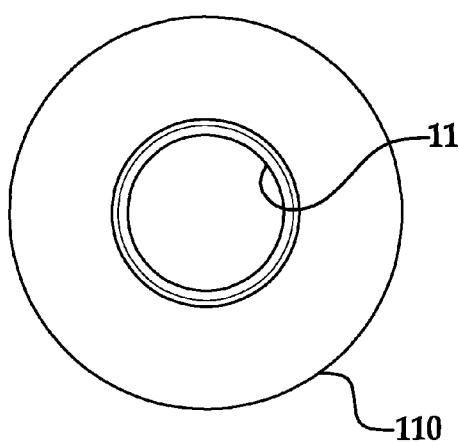
Figure 8B:
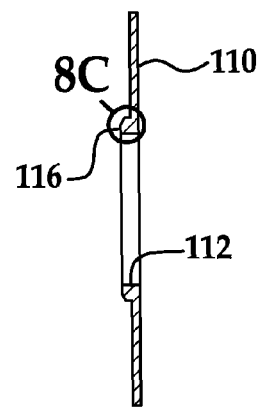
Figure 8C:
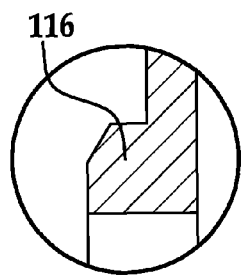

FIGS. 8A-8C illustrates a cap 110 that is configured to be secured to housing 88 after the additive or additives are disposed therein. In accordance with an exemplary embodiment of the present invention the cap is circular or disk shape with an opening 112 configured to receive a neck portion 114 of the housing therein. Of course, other configurations are contemplated to be within the scope of exemplary embodiments of the present invention. As illustrated, the neck portion 114 will extend past cap 110 to provide a feature for receipt into an opening of an end cap or end of the filter media. Cap 110 in one exemplary embodiment will have an annular feature 116 for receipt in an annular groove 188 of the housing. In one embodiment feature 116 will provide a heat staking member for securement of the cap to the housing by a vibration welding method, ultrasonic welding method or spin welding. Alternatively or in addition to the aforementioned welding techniques an adhesive is used to secure the feature into the groove. Similar features and methods may be employed to secure a peripheral end of the cap to the outer walls of the housing. Alternatively, the cap can be positioned such that the feature 116 is disposed on an exterior of the cartridge housing and the feature is used to align and seal the additive cartridge with the end cap or outlet opening of the filter housing.

In accordance with an exemplary embodiment a method of supplying an additive in an fuel filter is provided, the method comprising: forming a dispersement device housing with at least one chamber, sealing the at least one metering opening with a fuel soluble material the metering opening being in fluid communication with at least one chamber when the fuel soluble material is removed from the metering opening; sealing the dispersement device housing with a cap, the cap being configured to seal the at least one chamber within the dispersement device housing; and locating the dispersement device housing within a filter, the filter having a flow path such that fluid flowing into and out of the filter must be in fluid communication with additives being dispersed from the metering opening in the additive chamber.

Accordingly, the housing is first filled with an additive and then the housing is sealed with a cap. Since the cartridge in one embodiment is disposed between the filter media and the base plate or after the filter media and an outlet opening the housing may be inverted so that cap is disposed between the end or end cap of the media and the housing of the additive cartridge. Alternatively and depending on the configuration of the filter the cartridge may not need to be inverted during its installation.

Figure 9:
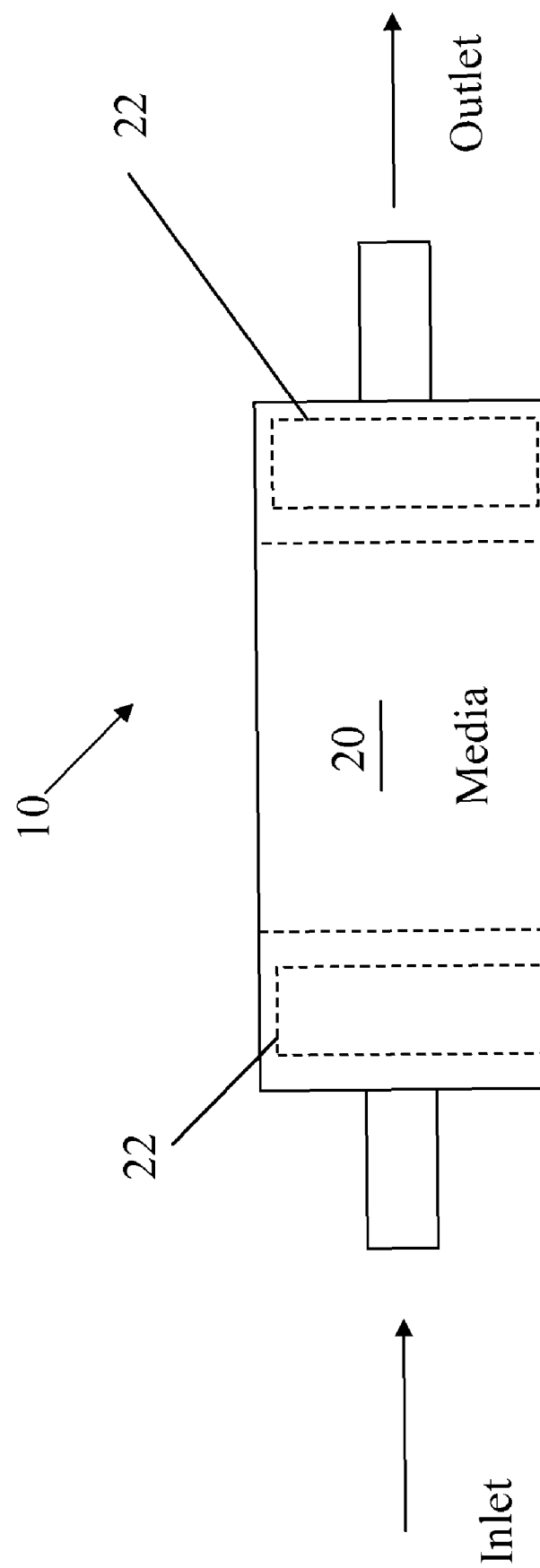
FIG. 9 is a schematic illustration of still another alternative exemplary embodiment of the present invention.

Referring now to FIG. 9 other configurations of the fuel filter are illustrated. Here fluid flows into the filter on one side and exits another side of the filer wherein the adsorbent or filter media 20 is disposed in the fluid path through the filter. In one embodiment, the additive cartridge is disposed between the inlet opening and the filter media (e.g., upstream from the filter media) or alternatively the additive cartridge is disposed between the outlet opening and the filter media (e.g., downstream, from the filter media). In yet another alternative, a pair of additive cartridges are employed one between the inlet opening and the filter media and the other between the outlet opening and the filter media.

It will be appreciated throughout this discussion that the singular forms "a", "an" and "the" include plural referents unless the context clearly dictates otherwise. Similarly, throughout "optional" or "optionally" means that the subsequently described event or circumstance may or may not occur, and that the description includes instances where the event occurs and instances where it does not. Likewise, the modifier "about" used in connection with a quantity is inclusive of the stated value and has the meaning dictated by the context (e.g., includes the degree of error associated with measurement of the particular quantity).

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for adding a lubricating additive to a diesel fuel, comprising:
   passing the diesel fuel through a fuel filter comprising an adsorbent that removes sulfur containing compounds from the diesel fuel; and
   releasing a lubricant additive into the diesel fuel after it has passed through the adsorbent, wherein the lubricant additive is released into the diesel fuel by a pump controlled by a controller and wherein the controller is coupled to at least one sensor configured to monitor the lubricant additive content in the diesel fuel, wherein the adsorbent comprises an inorganic oxide having a surface acidity characterized by a $pK_a$ of less than or equal to −3.

2. The method as in claim 1, wherein the fuel filter has at least one inlet opening and at least one outlet opening, the at least one inlet opening, the fuel filter and the at least one outlet opening define a flow path through the fuel filter and the adsorbent is disposed in the flow path and the lubricant additive is stored in an additive cartridge located within the filter, the additive cartridge being configured to disperse the lubricant additive into diesel fuel passing through the filter.

3. The method as in claim 1, wherein the fuel filter has at least one inlet opening and at least one outlet opening, the at least one inlet opening, the fuel filter and the at least one outlet opening define a flow path through the fuel filter and the adsorbent is disposed in the flow path and the lubricant additive is stored in an additive cartridge located within the filter, the additive cartridge being configured to disperse the lubricant additive into diesel fuel passing through the filter.

4. The method as in claim 3, wherein the additive cartridge is disposed between an inlet opening of the filter and the adsorbent.

5. The method as in claim 3, wherein the additive cartridge is disposed between an outlet opening of the filter and the adsorbent.

6. The method as in claim 1, wherein the fuel filter has at least one inlet opening and at least one outlet opening, the at least one inlet opening, the fuel filter and the at least one outlet opening define a flow path through the fuel filter and the adsorbent is disposed in the flow path and the lubricant additive is stored in a pair of additive cartridges located within the filter, the pair of additive cartridges being configured to disperse the lubricant additive into diesel fuel passing through the filter, one of the pair of additive cartridges being disposed between an inlet opening of the filter and the adsorbent and the other one of the additive cartridges being disposed between an outlet opening of the filter and the adsorbent.

7. The method as in claim 1, wherein the fuel filter has at least one inlet opening and at least one outlet opening, the at least one inlet opening, the fuel filter and the at least one outlet opening define a flow path through the fuel filter and the adsorbent is disposed in the flow path and the lubricant additive is stored in an additive cartridge located within the filter, the additive cartridge being configured to disperse the lubricant additive into diesel fuel passing through the filter.

8. The method as in claim 1, wherein the fuel filter has at least one inlet opening and at least one outlet opening, the at least one inlet opening, the fuel filter and the at least one outlet opening define a flow path through the fuel filter and the adsorbent is disposed in the flow path and the lubricant additive is stored in an additive cartridge located within the filter, the additive cartridge being configured to disperse the lubricant additive into diesel fuel passing through the filter, wherein the surface acidity of the inorganic oxide is attributable to Lewis acids.

9. The method as in claim 8, wherein the inorganic oxide is characterized by a surface that is substantially free of applied compounds comprising Group VIIIA metals, Group IV metals, alkali metals, alkaline earth metals, and mixtures thereof.

10. The method as in claim 8, wherein the inorganic oxide is substantially free of compounds comprising Group VIIIA metals, alkali metals, alkaline earth metals, and mixtures thereof.

11. The method as in claim 5, wherein the inorganic oxide is at least one of alumina, kaolinite (either sodium, ammonium or hydrogen forms), montmorillonite (either sodium, ammonium or hydrogen forms), silca magnesia, alumina-boria, activated alumina, zeolites, aluminosilicates, silica gels, clay, active clay, silicon dioxide, mesoporous silica porous material (FSM), silica alumina compounds, silica, alumina phosphate compounds, super acids, super acids-sulfated, titania, sulfated zironia, titanium dioxide, hafnium oxide, and mixtures thereof.

12. The method as in claim 1, wherein the inorganic oxide has a surface acidity characterized by a $pK_a$ less than or equal to −6.

13. The method as in claim 1, wherein the inorganic oxide has a surface acidity characterized by a $pK_a$ less than or equal to −8.

14. An system for controlling the release of a fuel additive into a diesel fuel, the system comprising:
    a housing having at least one inlet opening and at least one outlet opening configured to define a flow path therethrough;
    filter media disposed in the flow path, the filter media comprising an adsorbent that removes sulfur containing compounds from diesel fuel passing through the housing;
    an additive cartridge configured to disperse a lubricating additive into the diesel fuel;
    a controller for controlling the amount of lubricating additive that is released from the additive cartridge into the diesel fuel; and
    at least one sensor configured to monitor the lubricant additive content in the diesel fuel and provide a signal indicative of the lubricant additive content in the diesel fuel to the controller, wherein the controller releases the additive from the additive cartridge based upon the signal received from the at least one sensor, wherein the adsorbent comprises an inorganic oxide having a surface acidity characterized by a $pK_a$ of less than or equal to −3.

15. The system as in claim 14, wherein the adsorbent material is positioned in the flow path between the at least one inlet opening and the additive cartridge and the fuel must pass through the adsorbent before contacting the additive cartridge.

* * * * *